(12) United States Patent
Chandra et al.

(10) Patent No.: US 12,452,179 B2
(45) Date of Patent: *Oct. 21, 2025

(54) DYNAMIC RESOURCE ALLOCATION, SCHEDULING AND SIGNALING FOR VARIABLE DATA RATE SERVICE IN LTE

(71) Applicant: InterDigital Patent Holdings, Inc., Wilmington, DE (US)

(72) Inventors: Arty Chandra, Roslyn, NY (US); Jin Wang, Princeton, NJ (US); Mohammed Sammour, Alrabieh-Amman (JO)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,714

(22) Filed: Oct. 5, 2023

(65) Prior Publication Data

US 2024/0032085 A1   Jan. 25, 2024

Related U.S. Application Data

(63) Continuation of application No. 16/773,569, filed on Jan. 27, 2020, now Pat. No. 11,818,744, which is a
(Continued)

(51) Int. Cl.
*H04L 47/10* (2022.01)
*H04B 1/713* (2011.01)
(Continued)

(52) U.S. Cl.
CPC ............ *H04L 47/15* (2013.01); *H04B 1/713* (2013.01); *H04L 1/18* (2013.01); *H04L 5/0007* (2013.01);
(Continued)

(58) Field of Classification Search
CPC ........... H04W 72/543; H04W 72/0446; H04W 72/231; H04W 72/1263; H04W 72/232;
(Continued)

(56) References Cited

U.S. PATENT DOCUMENTS

| | | |
|---|---|---|
| 5,697,057 A | 12/1997 | Bursztejn et al. |
| 6,501,785 B1 | 12/2002 | Chang et al. |

(Continued)

FOREIGN PATENT DOCUMENTS

| | | |
|---|---|---|
| CN | 1292610 | 4/2001 |
| CN | 1375955 | 10/2002 |

(Continued)

OTHER PUBLICATIONS

3GPP, 3rd Generation Partnership Project; Technical Specification Group Radio Access Network; Feasibility Study for Evolved UTRA And UTRAN (Release 7), 3GPP TR 25.912 V0. 1.7 (Jun. 2006), (Jun. 2006).

(Continued)

*Primary Examiner* — Kibrom T Hailu
(74) *Attorney, Agent, or Firm* — Volpe Koenig

(57) ABSTRACT

A method and apparatus are provided for dynamic resource allocation, scheduling and signaling for variable data real time services (RTS) in long term evolution (LTE) systems. Preferably, changes in data rate for uplink RTS traffic are reported to an evolved Node B (eNB) by a UE using layer 1, 2 or 3 signaling. The eNB dynamically allocates physical resources in response to a change in data rate by adding or removing radio blocks currently assigned to the data flow, and the eNB signals the new resource assignment to the UE. In an alternate embodiment, tables stored at the eNB and the UE describe mappings of RTS data rates to physical resources under certain channel conditions, such that the UE uses the table to locally assign physical resources according
(Continued)

to changes in UL data rates. Additionally, a method and apparatus for high level configuration of RTS data flows is also presented.

20 Claims, 5 Drawing Sheets

Related U.S. Application Data continuation of application No. 15/678,934, filed on Aug. 16, 2017, now Pat. No. 10,548,159, which is a continuation of application No. 15/207,301, filed on Jul. 11, 2016, now Pat. No. 9,743,422, which is a continuation of application No. 11/842,543, filed on Aug. 21, 2007, now Pat. No. 9,391,805.

(60) Provisional application No. 60/839,110, filed on Aug. 21, 2006.

(51) Int. Cl.
*H04L 1/18* (2023.01)
*H04L 5/00* (2006.01)
*H04L 47/70* (2022.01)
*H04L 47/762* (2022.01)
*H04W 72/0446* (2023.01)
*H04W 72/543* (2023.01)
*H04L 1/1822* (2023.01)
*H04L 1/1867* (2023.01)

(52) U.S. Cl.
CPC ............ *H04L 5/003* (2013.01); *H04L 5/0064* (2013.01); *H04L 5/0094* (2013.01); *H04L 5/0096* (2013.01); *H04L 47/70* (2013.01); *H04L 47/762* (2013.01); *H04L 47/824* (2013.01); *H04W 72/0446* (2013.01); *H04W 72/543* (2023.01); *H04L 1/1822* (2013.01); *H04L 1/1896* (2013.01)

(58) Field of Classification Search
CPC ........ H04W 72/563; H04B 1/713; H04L 1/18; H04L 5/0007; H04L 5/003; H04L 5/0064; H04L 5/0094; H04L 5/0096; H04L 47/15; H04L 47/70; H04L 47/762; H04L 47/824; H04L 1/1822; H04L 1/1896; H04L 5/0053
See application file for complete search history.

(56) References Cited

U.S. PATENT DOCUMENTS

| | | | |
|---|---|---|---|
| 6,661,777 B1 | 12/2003 | Blanc et al. | |
| 6,748,220 B1 | 6/2004 | Chow et al. | |
| 6,804,520 B1 | 10/2004 | Johansson et al. | |
| 6,807,426 B2 | 10/2004 | Pankaj | |
| 6,940,831 B1 | 9/2005 | Omi et al. | |
| 7,110,771 B2 | 9/2006 | Fisher | |
| 7,130,311 B2 | 10/2006 | Yavuz et al. | |
| 7,164,654 B2 | 1/2007 | Hunzinger et al. | |
| 7,218,949 B2 | 5/2007 | Koo et al. | |
| 7,222,196 B2 | 5/2007 | Asthana et al. | |
| 7,263,365 B2 | 8/2007 | Rudowicz et al. | |
| 7,343,180 B2 | 3/2008 | Kazakevich et al. | |
| 7,403,782 B2 | 7/2008 | Winberg | |
| 7,539,165 B2 | 5/2009 | Toskala et al. | |
| 7,542,442 B2 | 6/2009 | Lee et al. | |
| 7,684,806 B2 | 3/2010 | Ovadia et al. | |
| 7,701,854 B2 | 4/2010 | Acharya et al. | |
| 7,817,614 B2 | 10/2010 | Yang et al. | |
| 8,095,141 B2 | 1/2012 | Teague | |
| 8,102,877 B1* | 1/2012 | Liu | H04L 47/782 370/255 |
| 9,066,214 B1* | 6/2015 | Yarkosky | H04W 4/16 |
| 2001/0006508 A1 | 7/2001 | Pankaj et al. | |
| 2002/0012332 A1 | 1/2002 | Tiedemann, Jr. et al. | |
| 2002/0114311 A1 | 8/2002 | Mazur et al. | |
| 2002/0183066 A1 | 12/2002 | Pankaj | |
| 2003/0022683 A1 | 1/2003 | Beckmann et al. | |
| 2003/0096619 A1 | 5/2003 | Winberg | |
| 2003/0117980 A1 | 6/2003 | Kim et al. | |
| 2003/0174645 A1 | 9/2003 | Paratainen et al. | |
| 2004/0023661 A1 | 2/2004 | Pi et al. | |
| 2004/0114574 A1 | 6/2004 | Zeira et al. | |
| 2004/0185860 A1 | 9/2004 | Marjelund et al. | |
| 2004/0192321 A1 | 9/2004 | Zhang | |
| 2005/0009532 A1 | 1/2005 | Cuffaro et al. | |
| 2005/0041681 A1* | 2/2005 | Lee | H04W 72/23 370/437 |
| 2005/0078629 A1 | 4/2005 | Bi et al. | |
| 2005/0117536 A1 | 6/2005 | Cho et al. | |
| 2005/0129019 A1* | 6/2005 | Cheriton | H04L 63/08 709/240 |
| 2005/0129058 A1 | 6/2005 | Casaccia et al. | |
| 2005/0143018 A1 | 6/2005 | Shinozaki | |
| 2005/0147123 A1 | 7/2005 | Asthana et al. | |
| 2005/0249141 A1 | 11/2005 | Lee et al. | |
| 2005/0276266 A1 | 12/2005 | Terry | |
| 2006/0039319 A1 | 2/2006 | Lee et al. | |
| 2006/0092911 A1 | 5/2006 | Hwang et al. | |
| 2006/0146856 A1 | 7/2006 | Jung et al. | |
| 2006/0159016 A1 | 7/2006 | Sagfors et al. | |
| 2006/0256758 A1* | 11/2006 | Malkamaki | H04L 49/9094 370/335 |
| 2006/0274690 A1 | 12/2006 | Chun et al. | |
| 2007/0025386 A1 | 2/2007 | Riedel et al. | |
| 2007/0025398 A1 | 2/2007 | Yonge et al. | |
| 2007/0081507 A1 | 4/2007 | Koo et al. | |
| 2007/0161377 A1 | 7/2007 | Kodikara Patabandi et al. | |
| 2007/0189320 A1 | 8/2007 | Wu et al. | |
| 2007/0217362 A1 | 9/2007 | Kashima et al. | |
| 2007/0254598 A1* | 11/2007 | Bachl | H04L 27/261 455/73 |
| 2008/0045164 A1 | 2/2008 | Usuda et al. | |
| 2008/0075006 A1 | 3/2008 | Morita | |
| 2008/0254804 A1 | 10/2008 | Lohr et al. | |
| 2009/0022098 A1 | 1/2009 | Novak et al. | |
| 2009/0185577 A1* | 7/2009 | Kishiyama | H04L 5/0053 370/204 |
| 2009/0303937 A1* | 12/2009 | Sawahashi | H04W 74/02 370/329 |
| 2011/0255518 A9 | 10/2011 | Agrawal8 et al. | |

FOREIGN PATENT DOCUMENTS

| | | |
|---|---|---|
| CN | 1430428 | 7/2003 |
| CN | 1453944 | 11/2003 |
| CN | 1536793 | 10/2004 |
| CN | 1649318 | 10/2004 |
| CN | 1564483 | 1/2005 |
| CN | 1719928 | 1/2006 |
| CN | 1777333 | 5/2006 |
| EP | 1 179 914 | 2/2002 |
| EP | 1 248 479 | 10/2002 |
| EP | 1 434 448 | 6/2004 |
| EP | 1 718 010 | 11/2006 |
| JP | 10-150386 | 6/1998 |
| JP | 2006-197269 | 7/2006 |
| KR | 2000-065705 | 11/2000 |
| RU | 2207723 | 6/2003 |
| WO | 2004/095867 | 11/2004 |
| WO | 2005/020519 | 3/2005 |
| WO | 2005/022798 | 3/2005 |
| WO | 2005/089003 | 9/2005 |
| WO | 2006/019267 | 2/2006 |
| WO | 2006/073271 | 7/2006 |

(56) References Cited

FOREIGN PATENT DOCUMENTS

| WO | 2006/118427 | 11/2006 |
|---|---|---|
| WO | 2008/051126 | 5/2008 |

OTHER PUBLICATIONS

3GPP, 3$^{rd}$ Generation Partnership Project; Technical Specification Group Radio Access Network; Requirements for Evolved UTRA (E-UTRA) and Evolved Utran (E-UTRAN) (Release 7), 3GPP TR 25.913 V7.3.0 (Mar. 2006), (Mar. 2006).

3GPP, 3$^{rd}$ Generation Partnership Project; Technical Specification Group Radio Access Network; Physical Layer Aspects for Evolved UTRA (Release 7), 3GPP TR 25.814 V2.0.0 (Jun. 2006), (Jun. 2006).

3GPP, 3rd Generation Partnership Project; Technical Specification Group Radio Access Network; Physical layer aspects for evolved Universal Terrestrial Radio Access (UTRA) (Release 7), 3GPP TR 25.814 V7.1.0 (Sep. 2006).

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.1.0 (Jun. 2007).

3GPP, 3rd Generation Partnership Project; Technical Specification Group Radio Access Network; Physical layer aspects for evolved Universal Terrestrial Radio Access (UTRA) (Release 7), 3GPP TR 25.814 V7.0.0 (Jun. 2006).

Alcatel-Lucent, "Status of stage 3 "Services provided by the physical layer" specification," 3GPP TSG RAN WG2#58, R2-072931, Orlando, USA (Jun. 25-29, 2007).

Catt et al., "Way Forward for UL Scheduling," 3GPP TSG-RAN WG2 Meeting #58, R2-071745, Kobe, Japan (May 7-11, 2007).

Catt, "Proposals for the uplink scheduling," 3GPP TSG-RAN WG2 ad-hoc on LTE, R2-061900, Cannes, France (Jun. 27-30, 2006).

Dahlman et al., "3G Evolution: HSPA and LTE for Mobile Broadband," 1$^{st}$ Edition, Academic Press (Jun. 7, 2007).

Ericsson et al., "E-UTRA Downlink Control Signaling—Overhead Assessment," TSG-RAN WG1 #44, R1-060573, Denver, CO, USA (Feb. 13-17, 2006).

Ericsson, "Persistent Scheduling for E-UTRA," TSG-RAN WG1 LTE AdHoc, R1-060099, Helsinki, Finland (Jan. 23-25, 2006).

Examination Decision on Petition for Invaldiation, issued by the China National Intellectual Property Administration regarding Chinese Patent No. 200780031049.1, Chinese Case No. 4W109265 (Apr. 3, 2020).

Jie et al., "An Adaptive Reverse Link Data Rate Control Scheme Based on Channel Quality for CDMA system," Proceedings of the IEEE International Conference on Networking and Mobile Computing, pp. 1091-1094, (Sept. 23-26, 2005).

Kim, "Optimum Packet Data Transmission in Cellular Multirate CDMA Systems with Rate-Based Slot Allocation," IEEE Transactions on Wireless Communications, vol. 3, No. 1 (Jan. 2004).

Lee et al., "Extended rtPS Algorithm for VoIP Services in IEEE 802.16 Systems", IEEE International Conference on Communications, 2006. ICC '06. vol. 5, pp. 2060-2065, (Jun. 2006).

Lee et al., "Extended rtPS for VoIP Services", IEEE C802.16e-04/522, (Nov. 4, 2004).

Lucent Technologies, "Data synchronisation for LTE E-MBMS Services," 3GPP TSG-RAN WG2 LTE Ad Hoc, R2-061944, Cannes, France (Jun. 27-30, 2006).

Motorola, Control Signalling Considerations, 3GPP TSG-RAN WG2 LTE Ad Hoc, R2-061995, (Cannes, France Jun. 27-30, 2006).

Motorola, Scheduling for Voice, 3GPP TSG RAN WG2 LTE AdHoc, R2-061994, (Cannes, France Jun. 27-30, 2006).

Nokia et al., "Update on Mobility, Security, Random Access Procedure, etc . . . ," 3GPP TSG-RAN Meeting #36, RP-070494, Busan, Korea (May 29-Jun. 1, 2007).

Nokia Siemens Networks, "Update on Mobility, Security, Random Access Procedure, etc . . . ," 3GPP TSG-RAN2 Meeting #58, R2-072338, Kobe, Japan (May 7-11, 2007).

Nokia Siemens Networks, "Update on Security, SU-1, Mobility, MBMS . . . ," 3GPP TSG-RAN2 Meeting #59, R2-073054, Athens, Greece (Jun. 20-24, 2007).

Nokia, *Signalling Control Overhead Due to Scheduling*, 3GPP TSG-RAN WG2 Ad-Hoc on LTE, R2-061976, (Cannes, France Jun. 27-30, 2006).

NTT DOCOMO, Inc., *Persistent Scheduling*, 3GPP TSG RAN WG2 Ad Hoc on LTE, R2-061920, (Cannes, France Jun. 27-30, 2006).

Panasonic, "Flexible rate transmission of BCCH," 3GPP TSG RAN WG2#52, R2-060887, Athens, Greece (Mar. 27-31, 2006).

Petition for Invalidation of Patents Rights, filed by Huawei Technologies Co., Ltd., against Chinese Patent No. 200780031049.1, Chinese Case No. 4W109265 (Jul. 22, 2019).

Qualcomm Europe, "PDCCH structure," 3GPP TSG-RAN WG1 #50, R1-073255, Athens, Greece (Aug. 20-24, 2007).

Qualcomm Europe, "TP on Scheduling of Real Time Services," TSG-RAN WG1 #44, R1-060483, Denver, CO, USA (Feb. 13-17, 2006).

Qualcomm Europe, Considerations for Control Signalling Support of Real Time Services, 3GPP TSG-RAN WG1 LTE Ad Hoc, R1-060173, (Helsinki, Finland Jan. 23-25, 2006).

Sjoberg et al., Real-Time Transport Protocol (TRP) Payload Format and File Storage Format for the Adaptive Multi-Rate (AMR) and Adaptive Multi-Rate Wideband (AMR-WB) Audio Codecs, IETF RFC 3267, (Jun. 2002).

Texas Instruments, Inc., "Efficient and Dynamic Uplink Resource Requirement Reporting in LTE", 3GPP TSG RAN WG2 LTE Ad-Hoc Meeting, R2-061833, (Cannes, France, Jun. 27-30, 2006).

Third Generation Partnership Project, "Technical Specification Group Radio Access Network; Multiplexing and channel coding (Release 8)," 3GPP TS 36.212 V1.3.0 (Jul. 2007).

Third Generation Partnership Project, "Technical Specification Group Radio Access Network; Physical layer procedures (Release 8)," 3GPP TS 36.213 V1.2.0 (May 2007).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V0.1.0 (Jun. 2007).

Third Generation Partnership Project, "Technical Specification Group Radio Access Network; Physical Channels and Modulation (Release 8)," 3GPP TS 36.211 V1.2.0 (Jun. 2007).

\* cited by examiner

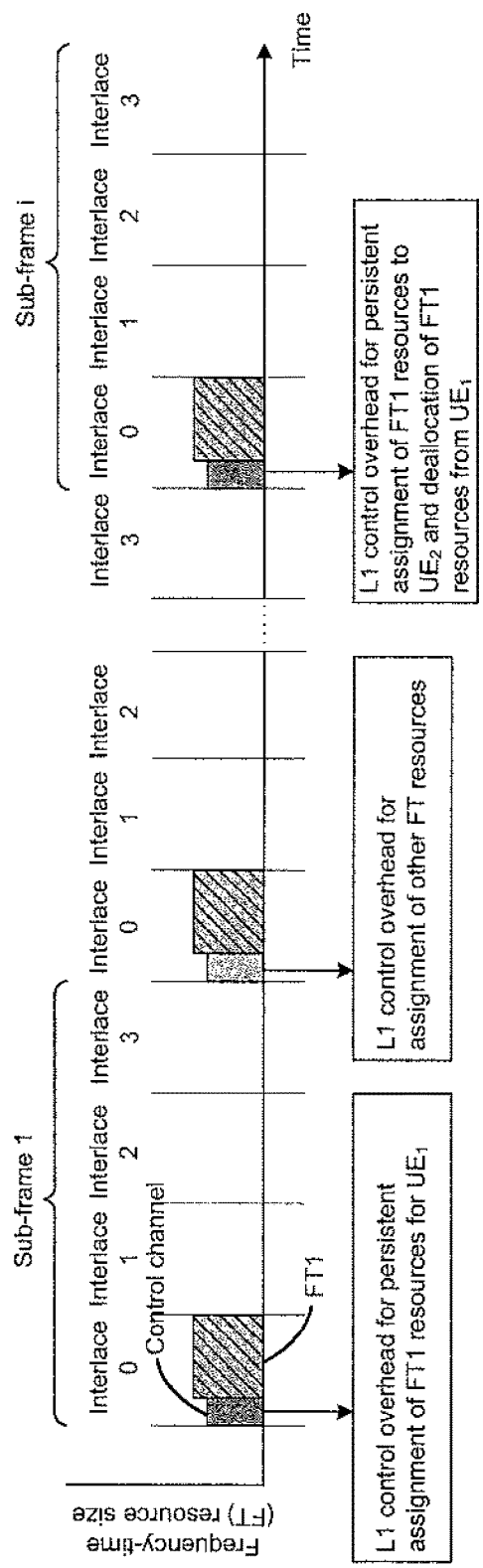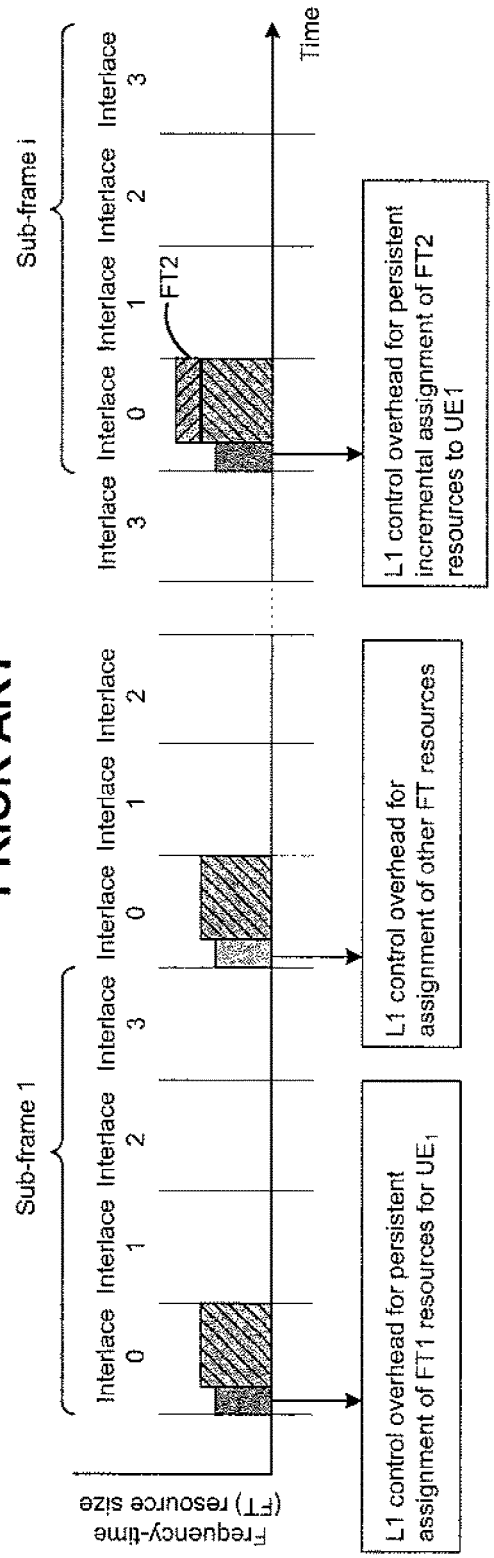
FIG. 2 PRIOR ART
FIG. 3 PRIOR ART

DYNAMIC RESOURCE ALLOCATION, SCHEDULING AND SIGNALING FOR VARIABLE DATA RATE SERVICE IN LTE

CROSS REFERENCE TO RELATED APPLICATIONS

This application is a continuation of U.S. patent application Ser. No. 16/773,569 filed on Jan. 27, 2020 which is a continuation of U.S. patent application Ser. No. 15/678,934 filed on Aug. 16, 2017 now issued as U.S. Pat. No. 10,548,159 on Jan. 28, 2020, which is a continuation of U.S. patent application Ser. No. 15/207,301, filed Jul. 11, 2016, and issued as U.S. Pat. No. 9,743,422 on Aug. 22, 2017, which is a continuation of U.S. patent application Ser. No. 11/842,543, filed Aug. 21, 2007, and issued as U.S. Pat. No. 9,391,805 on Jul. 12, 2016, which claims priority from U.S. Provisional Patent Application No. 60/839,110 filed on Aug. 21, 2006 which are incorporated by reference as if fully set forth.

FIELD OF INVENTION

The present invention is related to wireless communication systems. More particularly, the present invention is related to a method and apparatus for dynamic resource allocation, scheduling and signaling for variable data rate service in long term evolution (LTE) systems.

BACKGROUND

Wireless communication systems are well known in the art. Communications standards are developed in order to provide global connectivity for wireless systems and to achieve performance goals in terms of, for example, throughput, latency and coverage. One current standard in widespread use, called Universal Mobile Telecommunications Systems (UMTS), was developed as part of Third Generation (3G) Radio Systems, and is maintained by the Third Generation Partnership Project (3GPP).

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an Iu interface. The UTRAN is configured to provide wireless telecommunication services to users through wireless transmit receive units (WTRUs), referred to as user equipments (UEs) in the 3GPP standard, via a Uu radio interface.

For example, a commonly employed air interface defined in the UMTS standard is wideband code division multiple access (W-CDMA). The UTRAN has one or more radio network controllers (RNCs) and base stations, referred to as Node Bs by 3GPP, which collectively provide for the geographic coverage for wireless communications with UEs. One or more Node Bs are connected to each RNC via an Iub interface. RNCs within a UTRAN communicate via an Iur interface.

The Uu radio interface of a 3GPP system uses Transport Channels (TrCHs) for transfer of higher layer packet containing user data and signaling between UEs and Node Bs. In 3GPP communications, TrCH data is conveyed by one or more physical channels defined by mutually exclusive physical radio resources, or shared physical radio resources in the case of shared channels.

To improve reliability of data transmission, automatic repeat request (ARQ) or hybrid ARQ (HARQ) is implemented. HARQ and ARQ employ a mechanism to send feedback to the original sender in the form of a positive acknowledgment (ACK) or a negative acknowledgement (NACK) that respectively indicate successful or unsuccessful receipt of a data packet to a transmitter so that the transmitter may retransmit a failed packet. HARQ also uses error correcting codes, such as turbo codes, for added reliability.

Evolved universal terrestrial radio access (E-UTRA) and UTRAN long term evolution (LTE) are part of a current effort lead by 3GPP towards achieving high data-rate, low-latency, packet-optimized system capacity and coverage in UMTS systems. In this regard, LTE is being designed with significant changes to existing 3GPP radio interface and radio network architecture, requiring evolved Node Bs (eNBs), which are base stations (Node Bs) configured for LTE. For example, it has been proposed for LTE to replace code division multiple access (CDMA) channel access used currently in UMTS, by orthogonal frequency division multiple access (OFDMA) and frequency division multiple access (FDMA) as air interface technologies for downlink and uplink transmissions, respectively. LTE is being designed to use HARQ with one HARQ process assigned to each data flow and include physical layer support for multiple-input multiple-output (MIMO).

LTE systems are also being designed to be entirely packet switched for both voice and data traffic. This leads to many challenges in the design of LTE systems to support voice over internet protocol (VoIP) service, which is not supported in current UMTS systems. VoIP applications provide continuous voice data traffic such that data rates vary over time due to intermittent voice activity. Variable data rate applications like VoIP provide specific challenges for physical resource allocation, as described below.

eNBs in LTE are responsible for physical radio resource assignment for both uplink (UL) communications from a UE to the eNB, and downlink (DL) communications from eNB to a UE. Radio resource allocation in LTE systems involves the assignment of frequency-time (FT) resources in an UL or DL for a particular data flow. Specifically, according to current LTE proposals, FT resources are allocated according to blocks of frequency subcarriers or subchannels in one or more timeslots, generally referred to as radio blocks. The amount of physical resources assigned to a data flow, for example a number of radio blocks, is typically chosen to support the required data rate of the application or possibly other quality of service (QoS) requirements such as priority.

It has been proposed that physical resource allocation for DL and UL communications over the E-UTRA air interface in LTE can be made valid for either a predetermined duration of time, known as non-persistent assignment, or an undetermined duration of time, known as persistent assignment. Since the assignment messages transmitted by the eNB may target both the intended recipient UE of the assignment as well as any UEs currently assigned to the resources specified by the assignment, the eNB may multicast the assignment message, such that the control channel structure allows for UEs to decode control channel messages targeted for other UEs.

For applications that require sporadic resources, such as hypertext transport protocol (HTTP) web browser traffic, the physical resources are best utilized if they are assigned on an as-need basis. In this case, the resources are explicitly assigned and signaled by the layer 1 (L1) control channel, where L1 includes the physical (PHY) layer. For applications requiring periodic or continuous allocation of resources, such as for VoIP, periodic or continuous signaling of assigned physical resources may be avoided using persistent allocation. According to persistent allocation, radio resource assignments are valid as long as an explicit deallocation is not made. The objective of persistent scheduling is to reduce L1 and layer 2 (L2) control channel overhead, especially for VoIP traffic, where L2 includes the medium access control (MAC) layer. Persistent and non-persistent assignments by the L1 control channel may be supported using, for example, a persistent flag or a message ID to distinguish between the two types of assignment in an assignment message transmitted by the eNB.

FIGS. 2 and 3 illustrate examples of persistent allocation of frequency-time resources in LTE, where each physical layer sub-frame comprises four time interlaces to support HARQ retransmissions of negatively acknowledged data. Each interlace is used for the transmission of a particular higher layer data flow, such that the same interlace in a subsequent sub-frame is used for retransmission of packets that were unsuccessfully transmitted. A fixed set of frequency-time (FT) resources are assigned in each interlace for control traffic as a control channel, which may include the L1 common control channel (CCCH) and synchronization channel.

FIG. 2 shows an example of persistent allocation and deallocation. In sub-frame 1, a first set of frequency-time resources (FT1), including one or more radio blocks, are allocated to $UE_1$ via the control channel. Assuming the transmission of data to $UE_1$ completes after i-1 sub-frames, the eNB sends in sub-frame i a control message to $UE_1$ and $UE_2$ in order to deallocate resources FT1 from $UE_1$ and allocate them to $UE_2$. The control channel can be used in the intermediate sub-frames between sub-frames 1 and i for the assignment of other FT resources. FIG. 3 shows an example of persistent allocation and expansion, where eNB assigns additional physical resources FT2 to $UE_1$ in sub-frame i to support additional traffic for $UE_1$.

A characteristic of many real time services (RTS), such as voice services, is variable data rates. In the case of voice services, a conversation is characterized by periods of speech followed by periods of silence, thus requiring alternating, constantly varying data rates. For example, a typical adaptive multi-rate (AMR) channel for voice service supports eight encoding rates from 4.75 Kbps to 12.2 Kbps and a typical adaptive multi-rate wide-band (AMR-WB) channel supports nine encoding rates from 6.6 Kbps to 23.85 Kbps.

Current techniques for persistent resource scheduling are not designed to accommodate variations in data rates. Under conventional persistent allocation, physical resources are allocated to support either a maximum data rate for a data flow or some sufficiently large fixed data rate supported by the physical channel. Accordingly, physical resources are wasted because the resource allocation is not able to adapt to changes in required data rates resulting from, for example, intermittent voice activity.

In order to support variable data rates, an eNB must be signaled the changing data rates for both UL and DL traffic. In LTE systems, an eNB can easily monitor DL data rate variations that originate at the eNB and make efficient DL resource assignment. However, current UMTS systems and proposals for LTE systems do not provide a manner for an eNB to monitor data rate variations for UL traffic originating at a UE so that the eNB may accordingly assign the appropriate amount of UL physical resources in a dynamic and efficient manner. Additionally, current proposals for LTE systems do not support high-level configuration operations for VoIP service.

The inventors have recognized that there is a need in LTE systems for support of dynamic resource allocation in combination with persistent resource allocation, along with efficient scheduling and control signaling, in order to support RTS applications with changing data rates such as VoIP. Therefore, the inventors have developed a method and apparatus for solving these problems in LTE systems.

SUMMARY

A method and apparatus for radio resource allocation, scheduling and signaling for variable data rate and real time service (RTS) applications are provided, where the present invention is preferably used in long term evolution (LTE) and high speed packet access (HSPA) systems.

BRIEF DESCRIPTION OF THE DRAWINGS

A more detailed understanding of the invention may be had from the following description, given by way of example and to be understood in conjunction with the accompanying drawings wherein:

FIG. 2 is a diagram showing an example of persistent assignment allocation and deallocation in the time-frequency domain;

FIG. 3 is a diagram showing an example of persistent assignment allocation and expansion in the time-frequency domain;

DETAILED DESCRIPTION

Hereafter, a wireless transmit/receive unit (WTRU) includes but is not limited to a user equipment (UE), mobile station, fixed or mobile subscriber unit, pager, or any other type of device capable of operating in a wireless environment. When referred to hereafter, a base station includes but is not limited to a Node-B, evolved Node B (eNB), site controller, access point or any other type of interfacing device in a wireless environment. A base station is a type of WTRU.

Although Third Generation Partnership Project (3GPP) long term evolution (LTE) is used by way of example in the following description, the present invention is applicable to wireless communication systems including, but not limited to, high speed packet access (HSPA) and HSPA evolution (HSPA+) systems. Additionally, real time services (RTS) such as voice over internet protocol (VoIP) are used by way of example to describe the invention. However, the present invention is intended to support any intermittently transmitting or variable data applications, and may also be used to adapt resource allocation for retransmissions. In the following, radio access bearer (RAB) or logical channel may be used interchangeably with data flow.

According to a first preferred embodiment, high-level information for a RTS data flow including a data flow identification (ID), or equivalently a radio access bearer (RAB) or logical channel ID, and a hybrid automatic repeat request (HARQ) process ID, are transmitted from an eNB to higher layers of a recipient UE during a configuration stage prior to the transmission of the data flow. A HARQ process is preferably assigned for an entire data flow. Accordingly, the data flow ID and HARQ process ID are preferably only transmitted once at the beginning of the data flow and not on a per packet basis. For example, referring to FIG. 2, a data flow ID and HARQ process ID for a user equipment $UE_1$ is sent in sub-frame 1 in connection with the assignment of frequency-time (FT) resources FT1 to $UE_1$. Similarly, a data flow ID and HARQ process ID for another user equipment $UE_2$ is sent in sub-frame i in connection with the assignment of frequency-time (FT) resources FT1 to $UE_2$ following the completion of the use of FT1 by $UE_1$.

Additionally, packet sequence numbers are preferably assigned at higher radio link control (RLC) layers, such that sequence numbers are not used at lower layers such as physical (PHY) and medium access control (MAC) layers. Accordingly, the reordering of packets that are received is handled at or above the RLC layer, for example, by a layer 3 (L3) protocol such as radio resource control (RRC).

Figure 1:
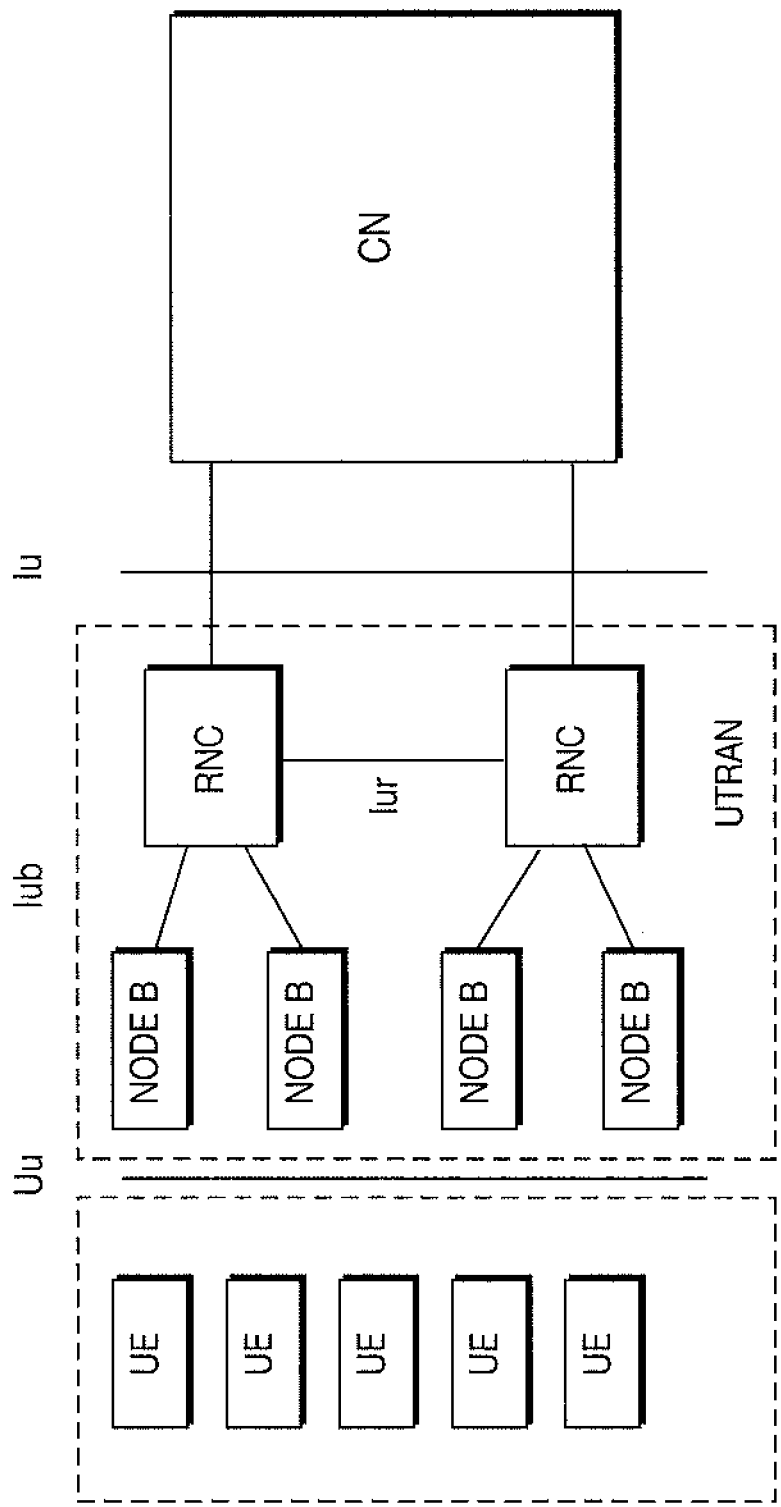
FIG. 1 is a block diagram of the system architecture of a conventional UMTS network.
Figure 4:
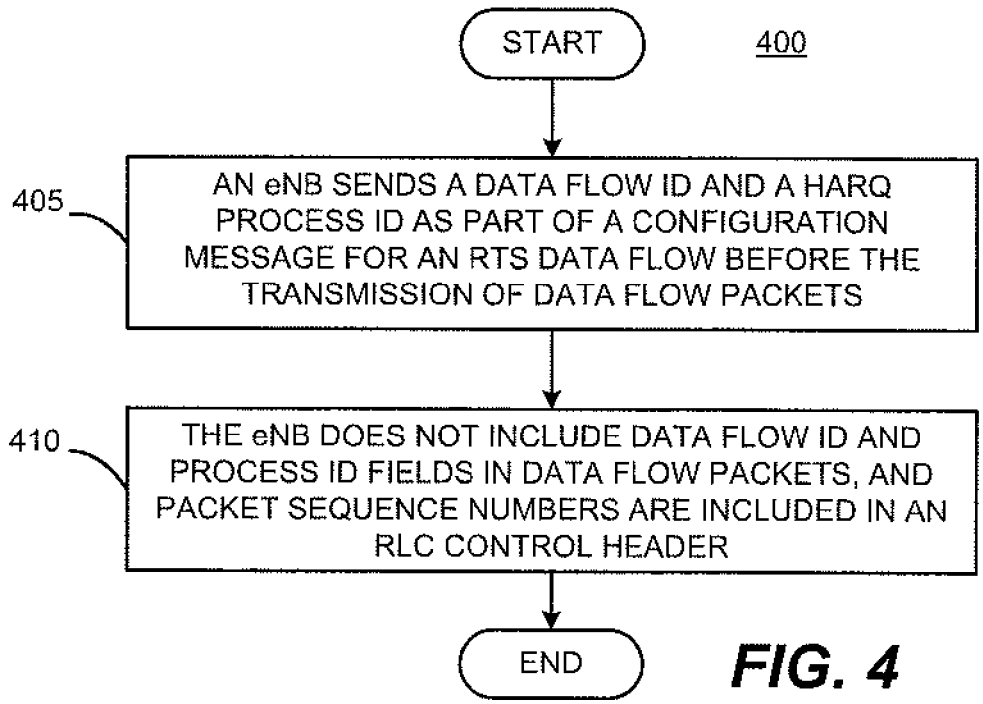
FIG. 4 is a flow diagram of a method for high-level configuration of real time services (RTS), in accordance with a first embodiment of the present invention.

FIG. 4 is a flow diagram of a method 400 for high-level configuration of RTS in accordance with the first embodiment of the present invention. In step 405, an eNB sends a data flow ID (or equivalently a RAB or logical channel ID) and a HARQ process ID as part of a configuration message for an RTS data flow before the transmission of data flow packets, for example in connection with FT1 assignment to $UE_1$ in subframe 1 of FIG. 2. In step 410, the eNB does not include data flow ID and process ID fields in data flow packets for higher layers, but packet sequence numbers are included in an RLC control header, for example, for packets transmitted in subframes 2 though i-1 for the $UE_1$ communication of FIG. 2 which ends. There is a resultant saving in higher layer signaling, since the higher layers received, for example, the data flow ID and HARQ process ID for the communication regarding $UE_1$ in sub-frame 1 which are then available for use in processing the data packets for the $UE_1$ communication that are received in sub-frames 2 through i-1 without repetitive signaling of the ID information. Further saving in signaling is realized through the elimination of sequence number signaling in the lower layers. In implementing method 400, a transmitter is configured to transmit data flow and HARQ process IDs in a configuration message and transmit packet sequence numbers in an RLC control header.

According to a second embodiment of the present invention, a UE preferably signals information to an eNB concerning variable data rates in uplink (UL) communications. This is preferably done by reporting a change in data rate relative to a current data rate. An RTS data flow is initially assigned a certain amount of physical resources in order to support a current data rate using, for example, persistent assignment. When the UE detects a new data rate, the UE preferably signals to the eNB the difference between the current data rate and the new data rate. By signaling only the difference in data rate, the number of overhead bits used is minimized.

By way of example, 4 reporting bits are required to report the actual data rate when up to 9 codec rates as used in a VoIP service. More reporting bits are used if more codec rates are available. When only the change in data rate is reported, the number of reporting bits is reduced from 4 to 3 because the greatest change in data rate from the lowest rate to the highest rate is only 8. Preferably, the minimum number of reporting bits is used to report the possible variations in data rate for a particular RTS service.

The change in data rate of an RTS data flow over the UL may be signaled using layer 1 (L1), layer 2 (L2) or layer 3 (L3) signaling, where L1 includes the physical (PHY) layer, layer 2 includes the medium access control (MAC) and radio link control (RLC) layers and layer 3 includes the radio resource control (RRC) layer. Alternatively, the change in data rate may be signaled at higher layers.

L1 signaling of changes in data rate of UL traffic is preferably done using L1 control signaling, such that variable data rate reporting bits may be multiplexed with other UL L1 signals including hybrid automatic repeat request (HARD), acknowledgment (ACK), negative acknowledgment (NAK) and channel quality indicator (CQI). Alternatively, an UL thin channel may be used. The UL thin channel is preferably used by a UE that needs to report a rate change to the eNB in an expedited manner so that the eNB assigns new UL resources to the RTS sooner. In another alternative, a data rate change indication can be sent using a synchronous random access channel (RACH), where the RACH has the benefit of small access delays.

The signaling of changes in data rate of UL traffic at L2 is preferably done by including rate change reporting bits in a MAC header of a packet scheduled for transmission over the UL. Alternatively, a rate change indication can be piggybacked with any UL L2 packet if the timing of the piggybacked packet is within a reasonable delay. Alternatively, a rate change indication can be sent via MAC control packet data unit (PDU), where the MAC control PDU may exclusively contain the data rate change indication or may contain other information for other control purposes. In another alternative, a rate change indication may be included in a periodic RLC status report from the UE to the eNB. Using L3 signaling, a change in data rate may be signaled by including a rate change indication in RRC signaling.

When the eNB detects the data rate change reported by a UE, the eNB dynamically reallocates physical resources assigned to the RTS of that UE accordingly. For example, if the data rate decreased, then the eNB can reallocate some of the resources originally assigned to the UE during persistent assignment to other UEs. The eNB may assign additional resources to the UE in the case of an increase in data rate.

Preferably, the dynamic allocation by the eNB overrides the initial resource allocation by persistent assignment. The eNB may specify a time duration during which the dynamic allocation overrides the original allocation when signaling the dynamic resource allocation to the UE. If no duration is specified, then it may be assumed that the dynamic allocation is only used once. The dynamic allocation by eNB to override persistent resource allocation is not only applicable to variable data rate services, but may also be used to reallocate resources for retransmissions.

Figure 5:
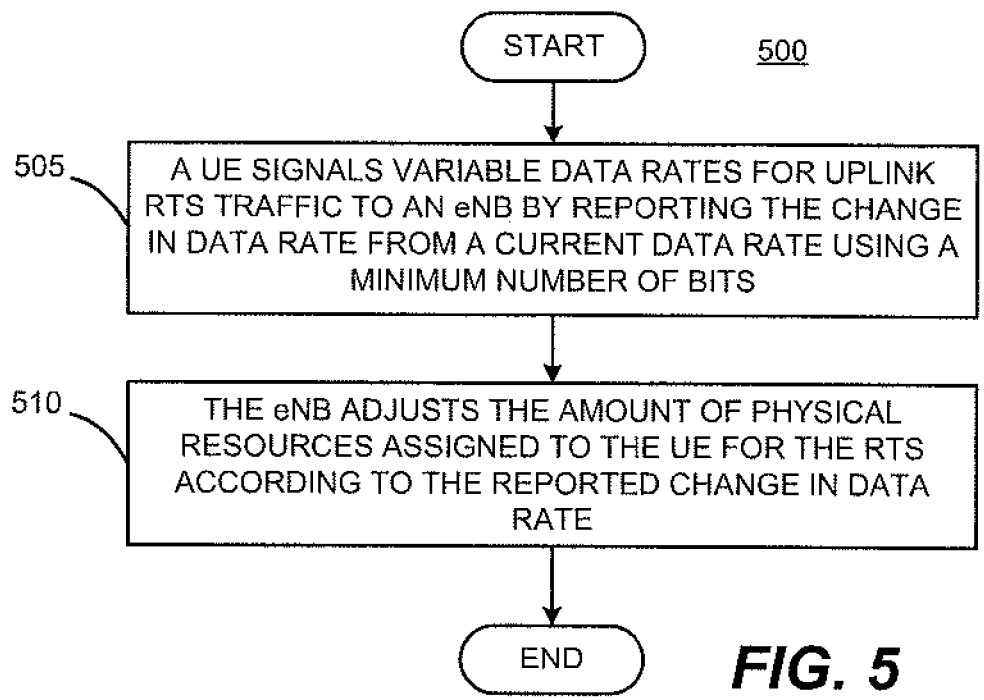
FIG. 5 is a flow diagram of a method for signaling variable data rates for uplink traffic, in accordance with a second embodiment of the present invention.

FIG. 5 is a flow diagram of a method 500 for signaling variable data rates for UL RTS traffic, in accordance with the second embodiment of the present invention. A UE signals variable data rates for UL RTS traffic to an eNB by reporting the change in data rate relative to a current data rate using a minimum number of bits, in step 505. The reporting may be done using L1, L2 or L3 signaling, as described above. In step 510, the eNB adjusts the amount of physical resources assigned to the UE for the RTS according to the reported change in data rate. In contrast with the prior art of FIGS. 2 and 3, the FT resource allocation for $UE_1$ made in sub-frame 1 does not necessarily remain fixed until sub-frame i, but can be dynamically changed per step 510 in a sub-frame prior to sub-frame i. In implementing method 500, a transceiver component may be configured to transmit signals reflecting change in data rate, and a resource allocation component may be configured to allocate physical resources.

According to a third embodiment of the present invention, DL and UL radio resources assigned to an RTS data flow are dynamically allocated in order to efficiently use the physical resources assigned to variable data rates services. Typically, the maximum amount of radio resources required for an RTS are initially assigned by persistent allocation, in order to support the maximum data rate for the RTS. For illustrative purposes, it is assumed that a set of N radio blocks are initially allocated by persistent scheduling. The eNB preferably dynamically allocates only a subset of the N radio blocks to the RTS data low when lower data rates are required. Under higher data rates, the eNB allocates a larger set of radio blocks, and can allocate new radio blocks in addition to the original set of N radio blocks, if desired. If sub-band allocation is supported, where radio resources are allocated according to fractions of a radio block, then dynamic resource allocation is preferably adapted to the granularity of sub-bands.

Preferably, only the change in radio resource allocation resulting from dynamic resource allocation is signaled by the eNB to the target UE in order to reduce signaling overhead. In one embodiment, the radio resource blocks assigned to the RTS are indexed, such that the radio blocks may be arranged in increasing or decreasing order according to index number. Accordingly, the eNB only signals the number of radio blocks for dynamic allocation, such that the UE accordingly uses the reported number of radio blocks in order of index number starting with the radio block with either lowest or the highest index number. By way of example, radio blocks indexed 2, 3, 5 and 8 are assigned to a UE (i.e. N=4) for an RTS data flow during persistent scheduling. In response to a decrease in data rate, the eNB reports that only 3 radio blocks are dynamically allocated to the UE. Based on the report from the eNB and starting with the lowest index, the UE knows that the new resource allocation is radio blocks 2, 3 and 5. Alternatively, a positive or negative difference between the original allocation of N blocks and the number needed may be signaled. Where more blocks are required, default parameters can be provided or block identification can be signaled for the additional blocks.

A new radio resource allocation is preferably signaled by a eNB to a UE as a field in L1 or L2 control signaling for fast DL or UL dynamic resource allocation, or, in L3 RRC signaling in the case of slowly changing resource allocation. When L1 or L2 control signaling is used, a physical layer ACK or NAK is preferably transmitted back to the eNB to improve the reliability of the resource allocation signaling. Additionally, information including, but not limited to, the duration of new radio resource allocation, repetition period, sequence pattern, radio resource and the frequency hopping pattern may be provided as part of the radio resource allocation signaling, when desired.

Figure 6:
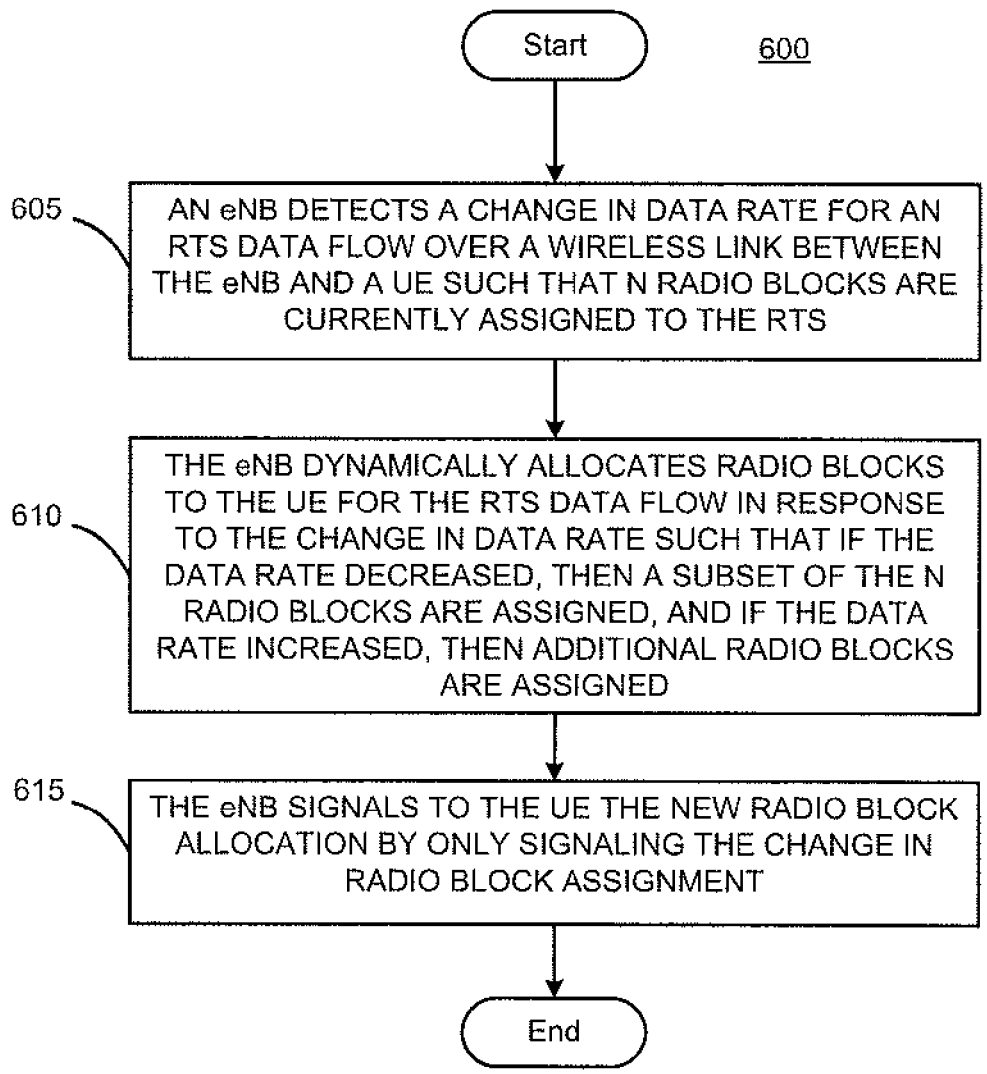
FIG. 6 is a flow diagram of a method for dynamic allocation and signaling of radio resources at an evolved Node B (eNB) for RTS with variable data rates, in accordance with a third embodiment of the present invention.

FIG. 6 is a flow diagram of a method 600 for dynamic allocation and signaling of radio resources at an eNB for RTS with variable data rates, in accordance with the third embodiment of the present invention. In step 605, an eNB is notified of a change in data rate for an RTS data flow over a wireless link between the eNB and a UE such that N radio blocks are currently assigned to the RTS. In step 610, the eNB dynamically allocates radio blocks to the UE for the RTS data flow in response to the change in data rate such that if the data rate decreased, then a subset of the N radio blocks are assigned, and if the data rate increased, then additional radio blocks are assigned. In step 615, the eNB signals to the UE the new radio block allocation by only signaling the change in radio block assignment. In contrast with the prior art of FIGS. 2 and 3, the FT resource allocation for $UE_1$ made in sub-frame 1 does not necessarily remain fixed until sub-frame i, but can be dynamically changed per step 615 prior to sub-frame i. In implementing method 600, a data rate detection component may be configured to detect changes in data rate associated with a data flow, and a resource allocation component can be configured to allocate physical resources and is associated with a transmitter in order to signal resource allocations to a UE.

In accordance with a fourth embodiment of the present invention, a table relating data rates to radio resource characteristics is used for efficient radio resource allocation and signaling of UL resources. Both the eNB and the UE preferably store a pre-calculated table relating a number of radio resource blocks, or when applicable sub-bands, required for RTS data rates for a range of channel conditions according to, for example, modulation and coding scheme (MCS). When a new data rate is identified at the UE for a current RTS data flow over the UL, the UE preferably calculates the needed radio resources under determined UL channel conditions based on the table entry for that data rate. Accordingly, the UE does not have to communicate with the eNB to adapt its resource assignment, and overhead control signaling to the eNB is reduced.

In a preferred embodiment, the eNB signals a pre-allocated table to the UE where the table identifies specific radio resources, such as radio blocks or sub-bands, that are required for various RTS data rates for a range of channel conditions. For example, radio blocks may be referred to by index number, as described above. The UE dynamically allocates UL resources in response to a change in data rate of an RTS data flow by looking up the corresponding resources in the table, and signals the assigned resource set to the eNB. The UE may wait for an approval message from the eNB before using the newly assigned UL resources. The eNB preferably sends an approval of new radio resource assignment when additional resources are allocated to accommodate an increase in data rate. The approval message from the eNB is optional when radio resources are deallocated for decreases in data rate.

Figure 7:
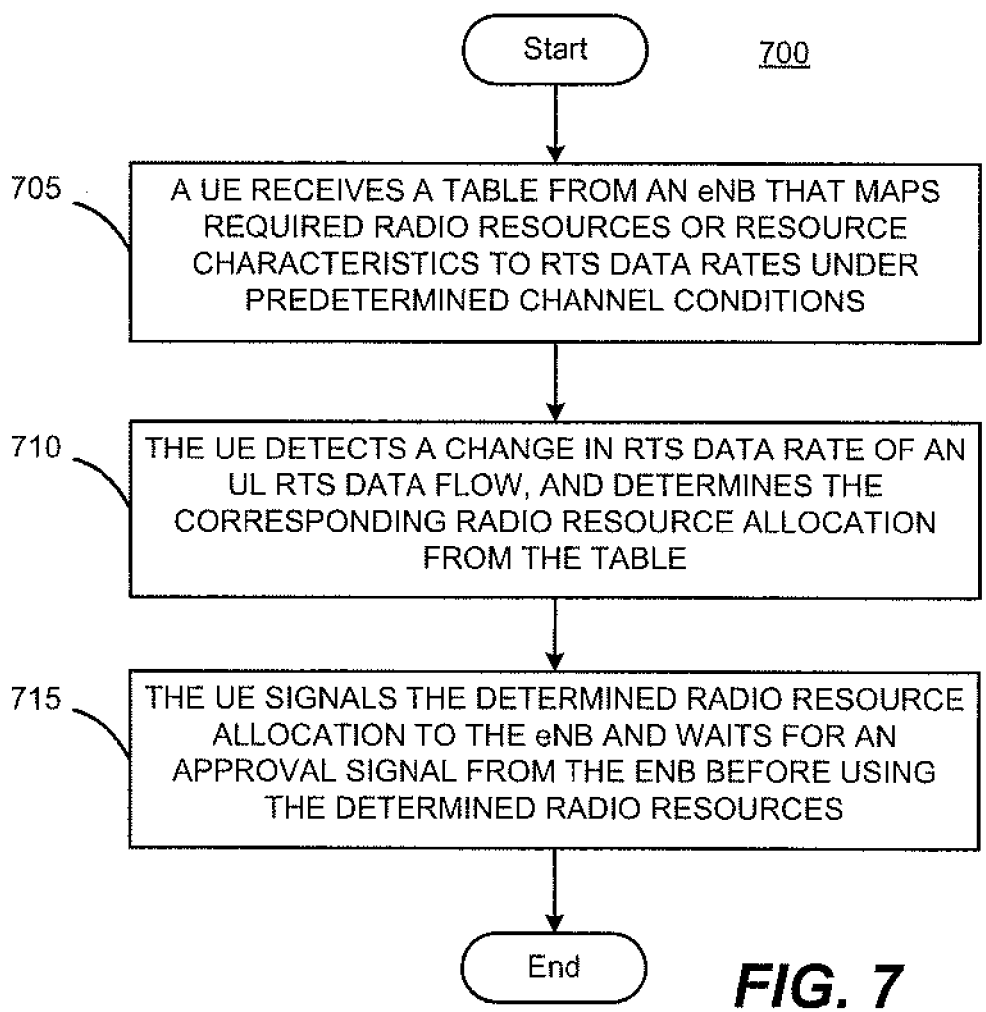
FIG. 7 is a flow diagram of a method for dynamic allocation and signaling of radio resources at a user equipment (UE) for RTS with variable data rates, in accordance with a fourth embodiment of the present invention.

FIG. 7 is a flow diagram of a method 700 for dynamic allocation and signaling of radio resources at a user equipment (UE) for RTS with variable data rates, in accordance with the fourth embodiment of the present invention. In step 705, a UE receives a table from an eNB that maps required radio resources or resource characteristics to RTS data rates under predetermined channel conditions. In step 710, the UE detects a change in data rate of an UL RTS data flow, and determines the corresponding radio resource allocation from the table. In step 715, the UE signals the determined radio resource allocation to the eNB and waits for an approval signal from the eNB before using the determined radio resources. In contrast with the prior art of FIGS. 2 and 3, the FT resource allocation for $UE_1$ made in sub-frame 1 does not necessarily remain fixed until sub-frame i, but can be dynamically changed in a sub-frame prior to sub-frame i. In implementing method 700, a transceiver is used to receive the table from the eNB and signal radio resource allocations to the eNB, and a data rate detection component is configured to detect changes in data rate.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for in use in a wireless transmit receive unit (WTRU), user equipment, terminal, base station, radio network controller, or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
    a transceiver; and
    a processor, wherein the transceiver and the processor are configured to:
    receive, from a network node, layer 1/layer 2 (L1/L2) control information, wherein the L1/L2 control information indicates, for a new dynamic allocation of resources for the WTRU, a frequency domain resource allocation, frequency hopping information, and repetition information; and
    transmit, to the network node, uplink data according to the L1/L2 control information.

2. The WTRU of claim 1, wherein the transceiver and the processor are further configured to:
    receive, from the network node, layer 3 (L3) control information including radio resource allocation information for uplink data transmission, in order to reduce L1/L2 control channel overhead.

3. The WTRU of claim 2, wherein the L3 control information indicates periodicity information, duration information, and sequence information.

4. The WTRU of claim 2, wherein the L3 control information is radio resource control (RRC) control information.

5. The WTRU of claim 2, wherein at least some of the received L1/L2 control information overrides the received L3 control information.

6. The WTRU of claim 1, wherein the uplink data is transmitted periodically according to the L1/L2 control information.

7. The WTRU of claim 1, wherein the transceiver and the processor are further configured to:
    receive, from the network node, second L1/L2 control information indicating a deallocation of the allocation of resources.

8. The WTRU of claim 1, wherein the transceiver and the processor are further configured to:
    transmit, to the network node, an acknowledgement message in response to the received L1/L2 control information.

9. The WTRU of claim 1, wherein the transceiver and the processor are further configured to:
    determine parameters for the uplink data transmission based on a locally stored table.

10. The WTRU of claim 1, wherein the L1/L2 control information is received in an orthogonal frequency division multiple access (OFDMA) format.

11. A method performed by a wireless transmit/receive unit (WTRU), the method comprising:
    receiving, from a network node, layer 1/layer 2 (L1/L2) control information, wherein the L1/L2 control information indicates, for a new dynamic allocation of resources for the WTRU, a frequency domain resource allocation, frequency hopping information, and repetition information; and
    transmitting, to the network node, uplink data according to the L1/L2 control information.

12. The method of claim 11, further comprising:
    receiving, from the network node, layer 3 (L3) control information including radio resource allocation information for uplink data transmission, in order to reduce L1/L2 control channel overhead.

13. The method of claim 12, wherein the L3 control information indicates periodicity information, duration information, and sequence information.

14. The method of claim 12, wherein the L3 control information is radio resource control (RRC) control information.

15. The method of claim 12, wherein at least some of the received L1/L2 control information overrides the received L3 control information.

16. The method of claim 11, wherein the uplink data is transmitted periodically according to the L1/L2 control information.

17. The method of claim 11, further comprising:
    receiving, from the network node, second L1/L2 control information indicating a deallocation of the allocation of resources.

18. The method of claim 11, further comprising:
    transmitting, to the network node, an acknowledgement message in response to the received L1/L2 control information.

19. The method of claim 11, further comprising:
    determining parameters for the uplink data transmission based on a locally stored table.

20. The method of claim 11, wherein the L1/L2 control information is received in an orthogonal frequency division multiple access (OFDMA) format.

* * * * *